United States Patent
DeKeyser

(10) Patent No.: US 8,310,540 B2
(45) Date of Patent: *Nov. 13, 2012

(54) LOOP RECORDING WITH BOOK MARKING

(75) Inventor: Paul DeKeyser, Irvine, CA (US)

(73) Assignee: Stellar, LLC, Irvine, CA (US)

( * ) Notice: Subject to any disclaimer, the term of this patent is extended or adjusted under 35 U.S.C. 154(b) by 1003 days.

This patent is subject to a terminal disclaimer.

(21) Appl. No.: 11/770,920

(22) Filed: Jun. 29, 2007

(65) Prior Publication Data

US 2008/0165249 A1 Jul. 10, 2008

Related U.S. Application Data

(60) Provisional application No. 60/842,097, filed on Aug. 31, 2006.

(51) Int. Cl.
*H04N 9/47* (2006.01)
*H04N 7/18* (2006.01)

(52) U.S. Cl. ...................................... 348/143

(58) Field of Classification Search .................. None
See application file for complete search history.

(56) References Cited

U.S. PATENT DOCUMENTS

| | | | | |
|---|---|---|---|---|
| 5,204,909 A * | 4/1993 | Cowan | | 381/106 |
| 5,418,529 A * | 5/1995 | De Luigi et al. | | 340/7.52 |
| 5,523,799 A * | 6/1996 | Hattori et al. | | 348/715 |
| 6,370,198 B1 * | 4/2002 | Washino | | 375/240.26 |
| 6,618,546 B2 * | 9/2003 | Ichioka et al. | | 386/46 |
| 7,587,323 B2 * | 9/2009 | Matz et al. | | 705/1 |
| 2006/0158968 A1* | 7/2006 | Vanman et al. | | 369/27.01 |

FOREIGN PATENT DOCUMENTS

EP 1064783 B1 * 6/2003
WO WO 92/22983 * 12/1992

* cited by examiner

*Primary Examiner* — Nhon Diep
(74) *Attorney, Agent, or Firm* — Fish & Associates, PC

(57) ABSTRACT

A methods in which a camera can store discrete segments of imaged data, using a sensor in the camera to capture image data, using multiple portions of a memory as a loop in which to record the segments in approximately real time, and protecting the multiple portions from being overwritten by subsequent recording in the loop. Recorder continues to record the image data immediately after ending at least one of the segments or immediately after protecting at least one of the segments. Protected data or segments can be wirelessly transmitting a first one of the segments to a memory, and releasing a corresponding one of the multiple portions of memory from protection. Recorder and signal switch are located or as part of an accessory, such as a pair of glasses.

19 Claims, 4 Drawing Sheets

LOOP RECORDING WITH BOOK MARKING

This application claims the benefit of U.S. provisional patent application Ser. No. 60/824,097, filed Aug. 31, 2006 which is incorporated by reference herein.

FIELD OF THE INVENTION

The field of the invention is in digital recording.

BACKGROUND

Conventional camcorders use a variety of disk formats such as digital video cassettes, mini-DV cassettes and DVD-R discs that offer a limited amount of memory to store data. One of the major shortcomings of the existing camcorder technology is that the memory runs out too soon. How many times does one hear, "I have no tape left" while recording? Once a portion of the memory has been recorded, there is less memory available for further recording. Then when the memory is full, users have to return to their home/work computer or media station to transfer the recorded data from the camera to free up the memory. This creates inconvenience and inflexibility for recording on the go.

One solution is the technology of loop recording in which the camera is constantly recording. When it reaches the end of the memory it records from the beginning, erasing the earliest recorded data. Such technology is often employed with surveillance cameras for long and continuous recording without much or any supervision. However, the problem with such loop recording is that it will not distinguish or differentiate any data that is of importance. The user then will have to transfer the interested data to another storage media by stopping the recording and storing the interested data onto another medium, or risk having the interested data be recorded over during loop recording.

Many surveillance recordings employ larger memory units to solve this problem. This then creates unnecessary long recordings that are not relevant or present any interest to the user. The portions of the interested data not only take up available memory for further recording but the entire loop has to be reviewed in order to select the most relevant portion. Again, this creates inconvenience and inflexibility for recording on the go.

Furthermore, users of the surveillance camera are not able to edit a given potion on the fly without stopping and replaying the image. The user must focus his or her attention on the viewfinder or display screen to keep the subject properly framed. This seriously hinders the operator's live enjoyment of the event being recorded since their attention is on the recording device and is not immersed in the sights and sounds of the event.

Thus, there is still a need for a camera that provides better recording and editing functions.

This and all other referenced extrinsic materials are incorporated herein by reference in their entirety. Where a definition or use of a term in an incorporated reference is inconsistent or contrary to the definition of that term provided herein, the definition of that term provided herein applies and the definition of that term in the reference does not apply.

SUMMARY OF THE INVENTION

The present invention provides apparatus systems and methods in which a camera storing discrete segments of imaged data comprising, using a sensor in the camera to capture image data; using multiple portions of a memory as a loop in which to record the segments in approximately real time; and protecting the multiple portions from being overwritten by subsequent recording in the loop.

In preferred embodiments, the loop is sufficiently large enough to store at least five minutes of the image data and be stored as a single file. When the recorder stores the first and second multiple data portions, they can be stored as separate files or a common file separate from the loop single file.

In yet another preferred embodiment, the recorder continues to record the image data immediately after ending at least one of the segments or immediately after protecting at least one of the segments. It is preferred that the recorder designate a beginning of the first one of multiple portions in response to a start signal from a user of the camera and an end of the first one of the multiple portions in response to a stop signal from the user.

The recorder can be operated preferably using a switch in a clothing accessory. The switch can be manually operated. The start signal can be an audio signal. Preferably for the first portion of multiple portions, a time span of the image data occurs prior to the start signal for at least 5 seconds, more preferably for at least 15 seconds.

In yet another preferred embodiment, the recorder can wirelessly transmit the first of the segments to a memory and release a corresponding one of the multiple portions of memory from protection.

It is preferred that a system comprises of electronics that allow storing discrete segments of imaged data by using a sensor in the camera to capture image data; using multiple portions of a memory as a loop in which to record the segments in approximately real time; protecting the multiple portions from being overwritten by subsequent recording in the loop; and a clothing accessory that supports the sensor. It is contemplated that the clothing accessory can be a pair of glasses in which a viewfinder is provided in the lens of the eye-glasses.

Various objects, features, aspects and advantages of the present invention will become more apparent from the following detailed description of preferred embodiments of the invention, along with the accompanying drawings in which like numerals represent like components.

DETAILED DESCRIPTION

The present inventive subject matter comprises methods and systems of storing discrete segments of imaged data in a camera by using a sensor in the camera to capture image data; using multiple portions of a memory as a loop in which to record the segments in approximately real time; and protecting the multiple portions from being overwritten by subsequent recording the loop.

Figure 1:
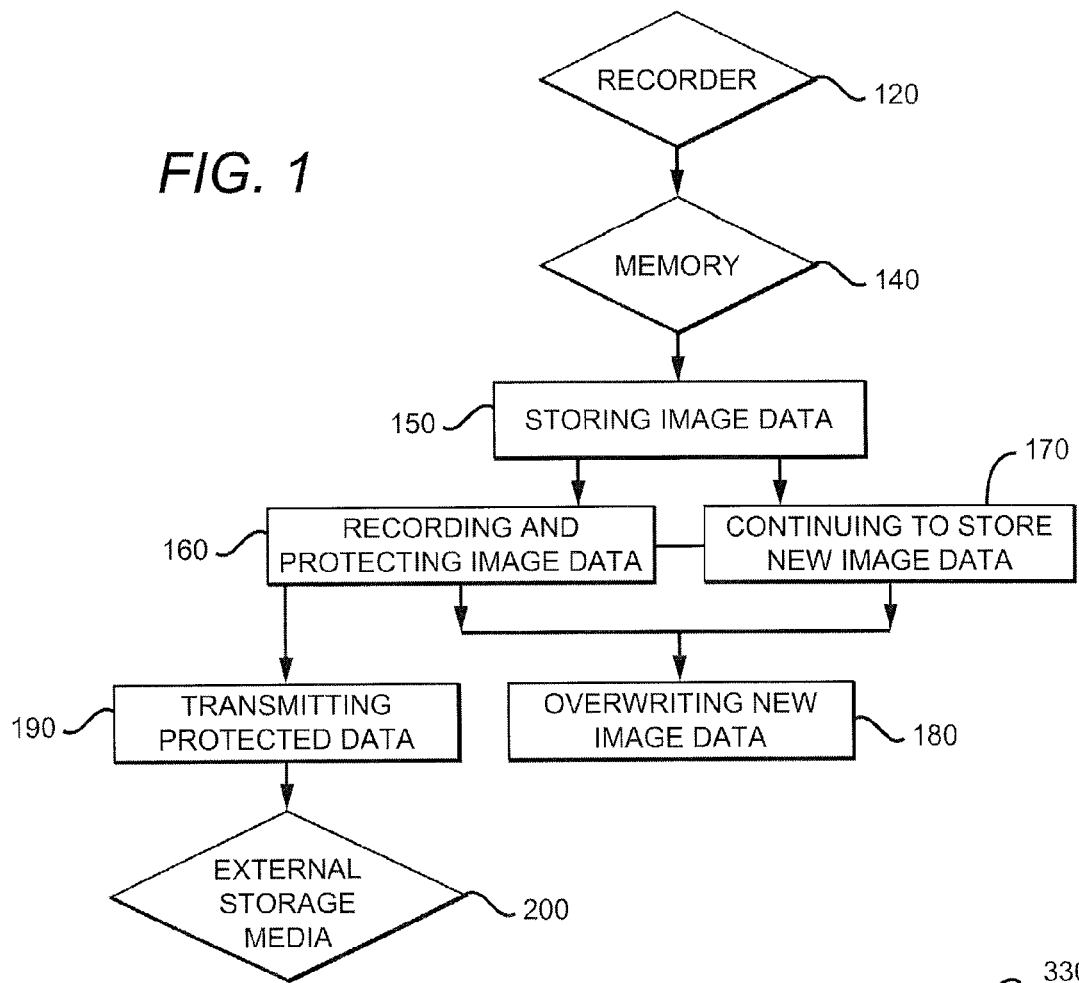
FIG. 1 is a block diagram illustrating the present inventive subject matter.

FIG. 1 is a block diagram generally includes the steps of a recorder 120 comprising a memory 140, storing image data onto the memory 150, recording and protecting image data onto memory 160, continuing to store new image data into available memory 170, overwriting new image data onto available memory 180, and transmitting protected data 190 to an external storage media 200.

Figure 2:
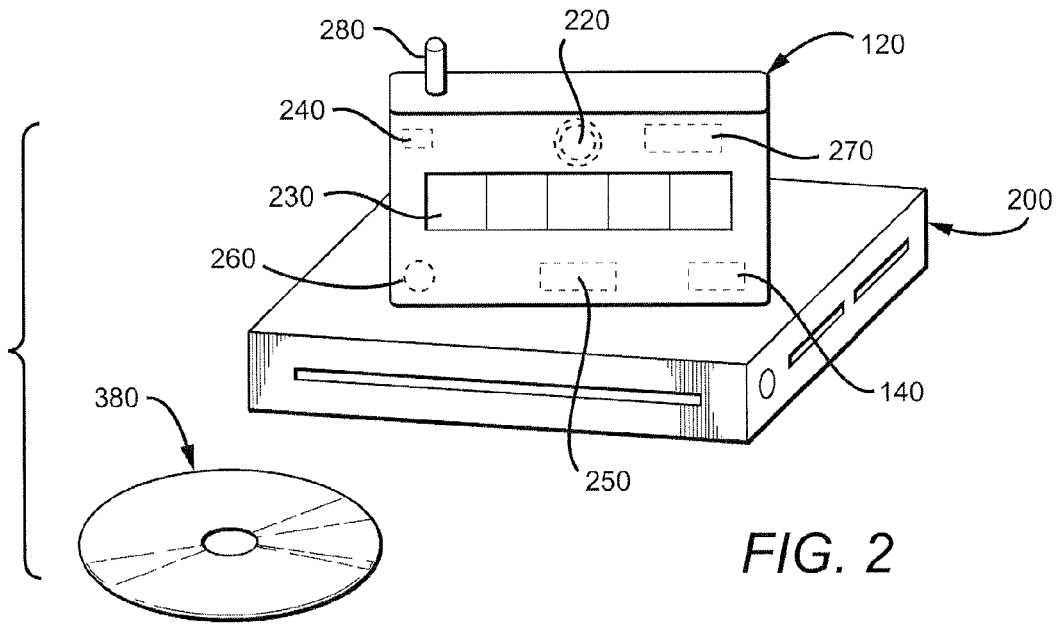
FIG. 2 is a camera embodying the present inventive subject matter.

Recorder 120 comprises imager lens 220, memory 140, control buttons 230, microprocessor 240, power source 250, microphone 260, hard drive 270, transmitter 280 and optional display screen (not shown) as shown in FIG. 2.

Recorder 120 can be any recording device that records video and/or audio data. Typically the recorder is a high performance digital video camera or camcorder but other formats, such as an analog recorder are contemplated. The recorder's electronics preferably are all on a unitary printed circuit board. The recorder preferably has at least one hard disk drive and audio and video input analog signal (from a source such as video camera or broadcast media) as well as a suitable monitor for receiving output audio and video analog signals.

Imager lens 220 is used to focus images for recorder 100. Conventional lenses allow one or more of the following adjustments: aperture (to control the amount of light), zoom (to control the field-of-view), and shutter speed (to capture continuous motion.). In preferred embodiments, these adjustments are automatically controlled by the camcorder electronics, generally to maintain constant exposure onto the imager without the manual adjustment from a user. It is contemplated that the preferred embodiments offer direct user control of all major optical functions. As with most modern digital recorders and camcorders, an analog-to-digital (ADC) converter is used to digitize the analog imager waveform output into a discrete digital-video signal. Thus, the recorder can be in both analog and digital format.

Contemplated memory 140 will vary depending on the particular configuration of the recorder. Particularly suitable memory include commercially available micro hard drives with a 1-inch disc (which may preferably have a capacity of more than 1 GB), flash memory cards with a capacity of up to 128 MB and more, and other transient and/or permanent memory units. Likewise, suitable memory may include SDRAM, SIMM, DIMM, etc. with a capacity of at least 32 MB, more preferably at least 64 MB, and most preferably above 128 MB.

In preferred embodiments, memory 140 is a SDRAM capable of storing at least 1000 frames of data. Once received by memory 140, frames are compressed by employing conventional compression rates and methods to achieve at least a 50:1 ratio.

In preferred embodiments, image data received by the recorder is stored in memory. Once the recorder is turned on, image data is continuously stored in a loop memory for access. If no record or protect button is pushed, the recorder will loop back and store the image data for a said length of time. Recording, book-marking and protecting are used synonymsly herein. Recording, book-marking and protecting means that a portion of the imaged data is recorded/book-marked/protected for protection upon an activation of a signal by a user and becomes what is called the protected data. Consequently, protected data cannot be overwritten by newly stored imaged data in the loop.

The loop preferably is large enough to store at least 3 minutes of data, more preferably 5 minutes and most preferred 10 minutes of data. However, it is contemplated that depending on the size and capacity of the device, any length longer or shorter is possible. It is preferred when the recorder is turned on the entire loop is treated and stored as a single file. Thus, if no recording is protected or bookmarked, then the entire file will be erased and the recording will start at the beginning of the loop.

Figure 3:
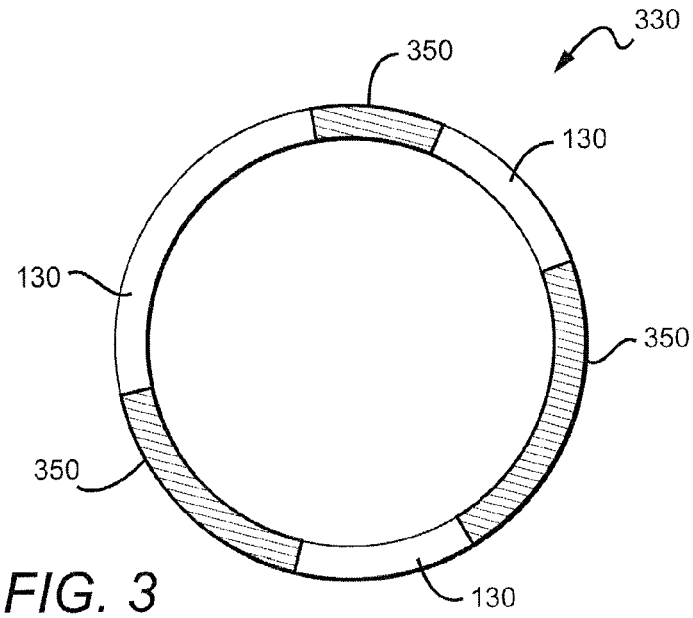
FIG. 3 is a diagram illustrating the memory of the present inventive subject matter.

In preferred embodiments, users can decide when to record or protect a portion of data being recorded by sending a signal. As shown in a diagram in FIG. 3, image data 130 marked for protection becomes protected data 350 in loop 330. Protected data 350 is characterized as a predefined portion of the recording data. It is contemplated that the portion of the loop that is marked as protected data cannot be overwritten once the recorder loops back to the beginning of the media. However, once protected data is transferred to an external storage media, the protected data then will go back to become image data that is available for loop recording.

User can activate a signal which will book-mark or protect the data on the loop. The signal can be generated from pushing a switch. Conceivably, the switch can be of a manually operated switch in which the user will push a button located on the recorder or a remote device. The switch can be something that is integrated as an accessory and is wearable on an individual. It is contemplated that the switch can be something that is portable and can be hidden or attached to other devices such as a vehicle, furniture, etc.

Furthermore, the signal can be generated based on different types of input such as an audio input. The user can also program the signal to activate based on a particular sound that is audible to the switch.

Once signal is activated, protected data is marked or protected for a fixed period of time. When the user wants to stop protecting image data the signal can then be deactivated. It is contemplated that even after the signal has been deactivated, image data can still be protected for an additional fixed period of time. Optionally, this fixed period of time can be configured for any suitable length. For example, the recorder might protect thirty seconds before the signal and thirty seconds after the signal; or it might protect fifteen seconds before the signal and two minutes after the signal.

Protected data 350, once marked, are stored separately from the loop. Various discrete segments of protected data can be stored as a common file or individual files, as long as it is separated from the loop. Following the next step in FIG. 1, recorder 120 will continue to store new image data into available memory 170. The image data will continue to record in the loop after the protected data has been recorded and protected. For portions of the memory that are not protected, new image data will overwrite it when it has reached its full capacity of memory. With a new cycle of recording, user can record and protect new image data. Since the memory is in a loop, there will be a continuous image data streaming from the recorder. Instead of catching just a clip by clip portion, all the imaged data stored are on one continuous cycle.

In preferred embodiments, protected data can be stored in the recorder as is or transmitted to another storage media as shown in step 190. When protected data is stored and not transmitted to another storage device, the recorder will then store new image data on the remaining available unprotected memory in the loop. To save space in the loop, protected data 350 can be alternatively transmitted into a physically external storage media 200.

As shown in FIGS. 2 and 4, a recorder 120 has a transmitter 280 to transmit and receive the protected data to external storage media 200. When enabled, transmitter 280 transmits the protected data into an external storage media 200. Alternatively, recorder 120 can be connected to the external storage media 200 to download the protected data. External storage media 200 can be a host computer, flash memory card, portable memory car, a digital video recorder station, and other contemplated media storage devices. In preferred embodiments, external storage media 200 writes the data received onto a DVD 380. It is contemplated that other memory storage formats are considered such as a CD-Rom, flash memory, etc. As is well known in the art, a transmitter can be built into the recorder exposed. The size and shape of transmitter are determined primarily by the frequency of the signal they are designed to receive. Recorder 120 can also comprise connector ports (not shown) that are employed to communicate with an external storage media 200, wireless or by hardwire. Particularly preferred, wireless transmitter interface includes a radio transceiver (e.g., interface following the 'blue tooth' standard) or an opto-electronic transceiver (e.g., an IR-transceiver).

Microprocessor 240 is any component of recorder 120 which manipulates data. The processor receives and stores image data, mark protected data, and processes the protected data to match what the user has commanded. Microprocessors are advantageously included in at least the housing of the recorder to facilitate the communications of all data. The microprocessor may operate a RAM, ROM or other data storage device.

In a preferred embodiment of the present invention, the microprocessor is programmed to allow editing function upon receiving image data or protected data. Similarly, the microprocessor is programmed to determine which portion of the loop protected data has been used and which portion is still available for further use.

Any data received by the microprocessor can be transmitted over the network. Data is preferably transmitted via the Internet but may be transmitted by telephone line, radio, pager, two-way pager, cable, and any other suitable communication mechanism.

It is generally contemplated that the microprocessor and the memory may vary considerably and that a particular configuration of such elements will predominantly depend on the type of computations employed.

Control buttons 230 allow a user to manipulate and control image data and to generate protected data. Particularly preferred recorders include control buttons, to record, delete, store, transmit, display, print and so forth. Control buttons can be located anywhere on the recorder preferably somewhere inconspicuous. Control buttons can be built in or used in lieu of a display screen (not shown) with touch-pad capabilities. In preferred aspects, control buttons further include an on/off switch, a execute button or a clear button. Control buttons can be of a different color than the housing and preferably be on the front of the recorder.

Whether embodied in control buttons or in some other manner, it is contemplated that recorder can include some sort of security control requiring a password and some sort of automatic turnoff feature that activates after a certain amount of inactivity.

Furthermore, depending on the particular configuration and size of the recorder, it is contemplated that the recorder is configured to have a power source 420. The power source may vary considerably. For example, when the recorded is relatively large, a suitable power source may include a rechargeable battery. On the other hand, when the recorder is relatively small, an appropriate power source may include an external power source (e.g., transformer for wall outlet or cigarette lighter adapter).

It is also preferred that recorder 120 has a microphone 260 that allows for the receiving of audio signal and an optional display screen that displays images being recorded. However, in preferred embodiments of the recorder no display screen is needed to for secured recording.

One purpose of the invention is to allow secret recording by a user. The user can integrate the recorder as part of his/her wardrobe or even as clothing accessories, such as a pin or a hat. Preferably, recorder will record video and audio as seen from the wearer's point of view without requiring the wearer to exert any special effort to operate the recorder. The recorder operates for extended periods of time while remaining unobtrusive both to the wearer/operator and to the subject(s) being recorded.

This preferred embodiment is shown in FIGS. 3-7 and comprises a miniature solid state recording device 400 coupled with a head-mounted camera 410. Other components of the head mounted camera 410 comprise a viewfinder image lens 420 integrated into a pair of eyeglasses 430, a remote activating device 440 attached to the hand as a finger ring, a recorder 450 and a separate external copying device 460.

Viewfinder image lens 420 is calibrated to have the same field of view as a camera. Preferably, viewfinder image lens 420 is embedded in between the two glass lenses 460 of the eyeglasses 430. Preferably viewfinder image lens 420 is a zoom lens with preferred standard zoom ration of 3× in and out of the focal length of the camera. A more sophisticated viewfinder image lens 420 is contemplated to have a greater zoom range and also has nighttime vision and is able to render images under different light conditions. Conceivably, viewfinder image lens 420 may be permanently fixed to camera 410, or it may be interchangeable with lenses of different focal lengths and other properties depending on the need and circumstances of use.

Figure 6:
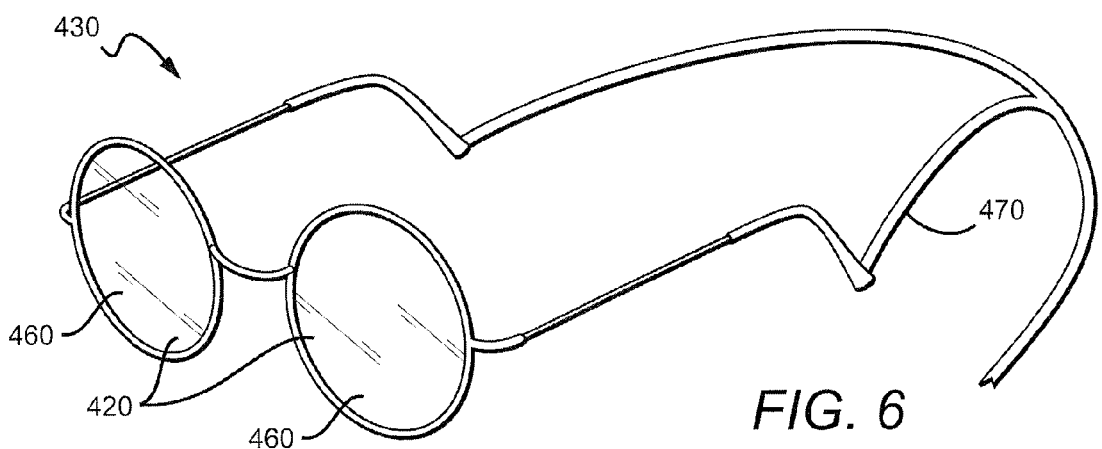
FIG. 6 is yet another embodiment of the camera.

In an alternative embodiment as shown in FIG. 6, the lenses 460 of eyeglasses 430 are viewfinder image lens 420. Thus, instead of having the viewfinder image lens 420 in between lenses 460, user can directly use the eyeglasses as the viewfinder lens. Within the lenses, viewfinder image lens 420 is outlined by tinted area or graticle and the outline graticle is embedded with glowing fiber optic filament. Eye-glasses are made preferably from opaque, translucent, or possibly photo gray-type tint of glasses. Alternatively, glasses change color slightly when energized.

Figure 5:
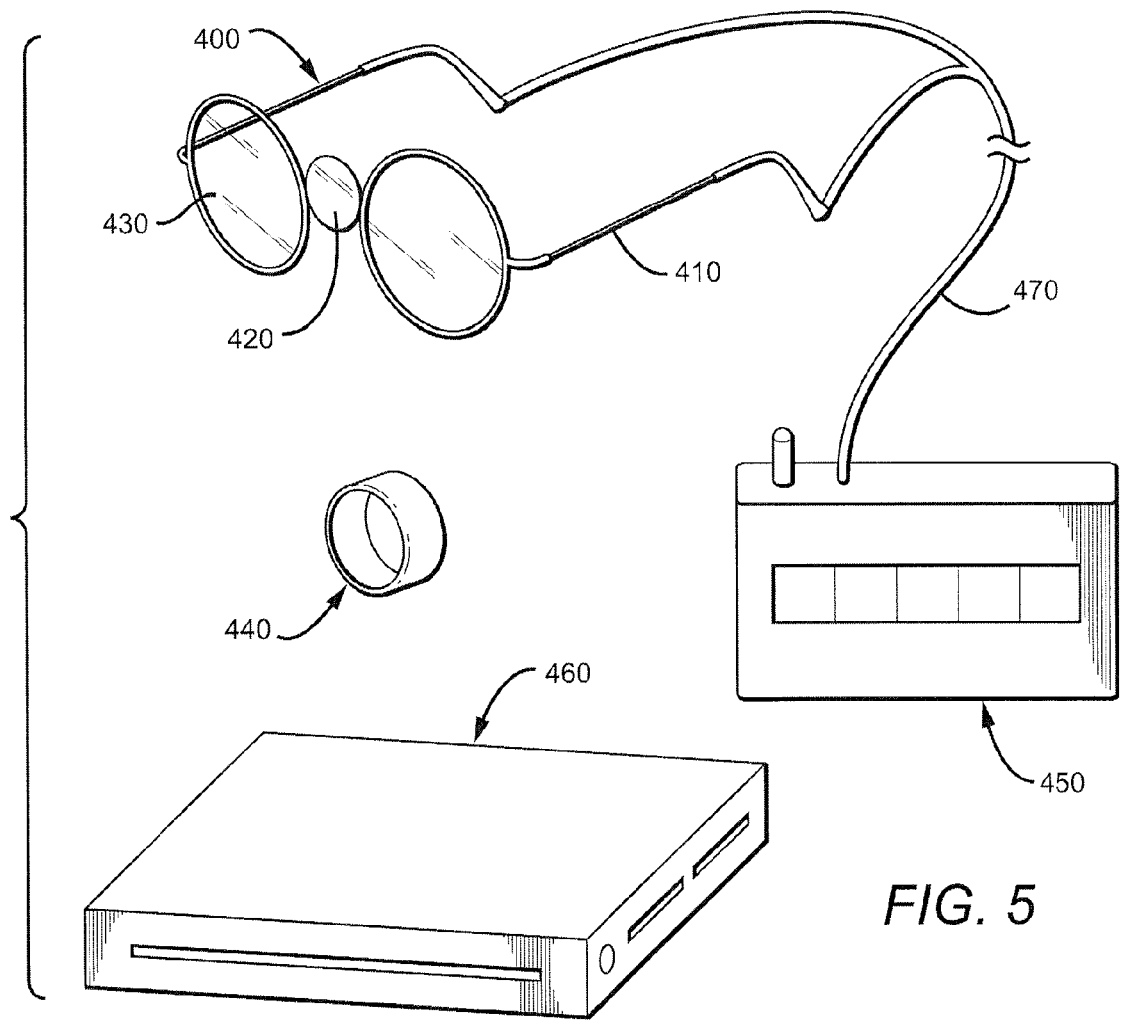
FIG. 5 is another embodiment of the camera recorder.
Figure 7A:
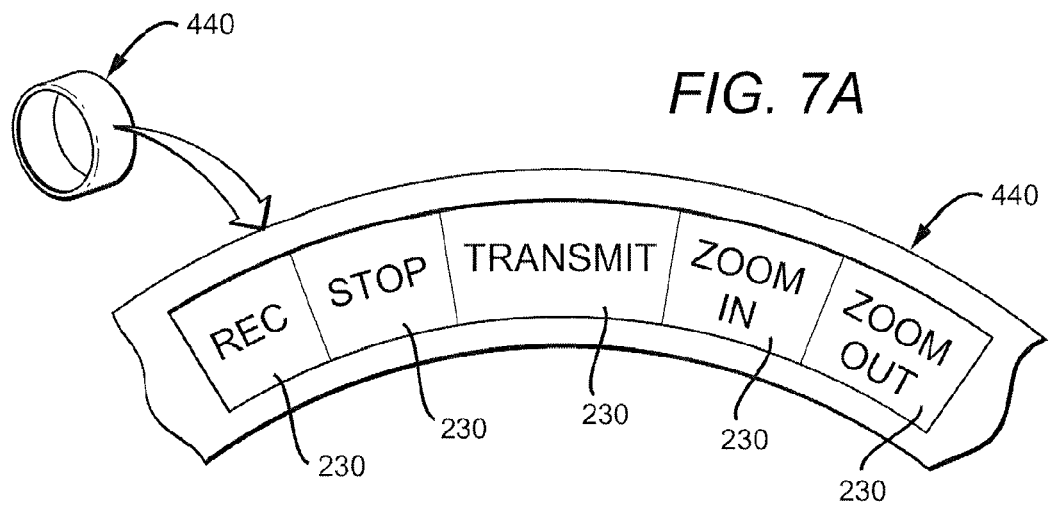
FIG. 7A is a close up view of a remote control device according to the present inventive subject matter.
Figure 7B:
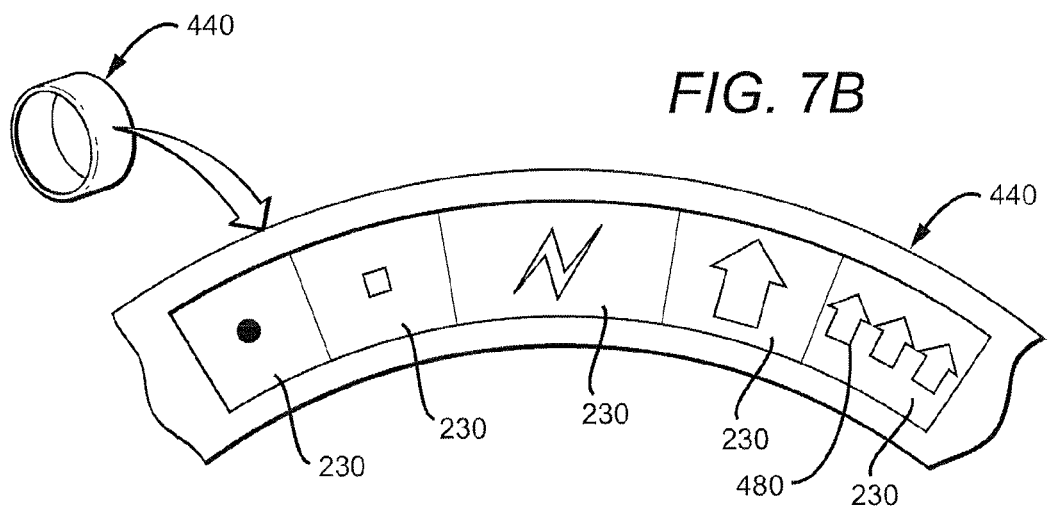
FIG. 7B is another close up of the remote control device.
Figure 8:
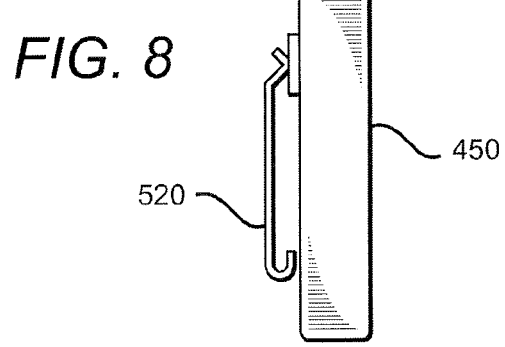
FIG. 8 is a side view of the camera recorder.

At any moment, the user may signal camera 410 to place a "bookmark" in the recording. This signal may be sent by pressing a button that will then transmit a signal through wires 470 that attach to the glasses then to the recorder. The wires 470 can be fiber optic wires that are small and thin to avoid detection. Or more conveniently, the signal can be sent by activating a remote control 440 as shown in FIG. 5. For maximum ease, remote control 440 may be built into a ring worn on the wearer's finger. Likewise, the signal could be sent wirelessly. Control buttons 230 are built in or on the remote control 440 as shown in FIG. 7A. User can control by turning the camera on and off, recording a portion of image data, stop the recording, zooming in and out of image data; and transmitting protected data into the recorder device 450. In the alternative, decorative symbols can be place in lieu of words of function onto the control buttons 230 of the ring remote control 440 for concealment as shown in FIG. 7B.

In general, user manipulates the camera to record data by using the remote control. Protected data is sent wirelessly to the recorder device through fiber optics lanyard attached to the eyeglasses.

Figure 4A:
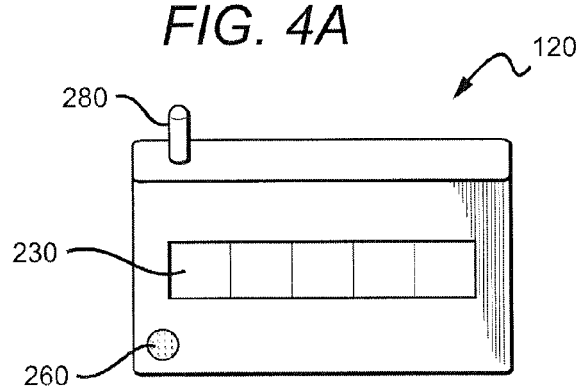
FIG. 4A is a front view of the camera recorder.
Figure 4B:
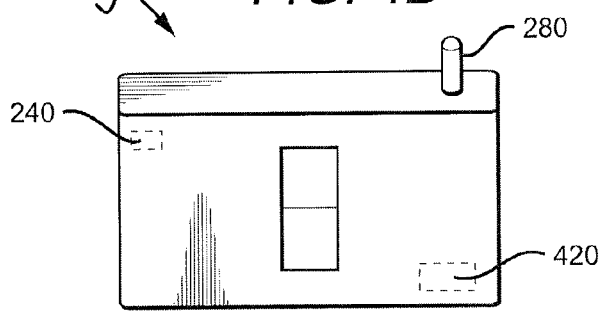
FIG. 4B is a back view of the camera recorder

In preferred embodiments, camera 410 is connected to a recorder device 450 as shown in FIG. 5. A wearer can clip recorder device 450 as a belt clip or a compact device (disguise as MP3 player) that can be put in purse or file without being recognized as recorder as shown in FIGS. 4A, 4B, and 9. Recorder device 450 has a belt 520 that can be clipped into place. Similar to the remote control, recorder device 450 has control buttons that allow users to: control the on and off switch of the camera, record portions of image data, stop recording, zoom in and out of image data and transmit protected data.

Protected data 350 is then sent to the recorder device by an image sensor that outputs data directly in "block" format typically converted in raster-to-block converter. Further compression is needed to transmit data. Either DCT or wavelet transformed data on native sensor format (Bayer codes).

Recorder device 450 also houses the memory and the microprocessor used for the device. When recorder device 450 is on, it will automatically store all image data received by the viewfinder image lens and then onto the built-in memory. As it receives new image data, the recorder device will then automatically loop record image data, overwriting oldest frames when full. Alternatively, when a user presses the control button to start recording, the recorder saves a predetermined amount of time before and after the activation of the control button, which will prevent later recording from overwriting this "bookmarked" section. User can then transmit the protected data by pushing the transmitting control button wirelessly.

Alternatively, after turning off the recorder device, user can plug the recorder device into an external source such as the external storage device 200 that contains a DVD burner. As shown in FIG. 2, the user loads a blank DVD 380 into the external storage media 200, presses a button, and the device copies all of the bookmarked sections to the DVD creating a new chapter for each bookmarked section. This allows the user to view only the portions of the recording that were bookmarked to seek easily from one highlight to the next.

In order for the device to be practical, physical size and weight are of primary importance. The recorder portion must be small and lightweight enough to be unobtrusive. Preferably, the size of the recorder is two inches by three inches by one-half inch and six ounces in weight including battery. The camera or imaging component must be small and lightweight enough to be mounted on a pair of eyeglasses without conspicuous bulk or uncomfortable weight on the order of one-quarter inch by one-quarter inch by one inch or smaller and weighing one ounce or less. Further, the imaging component must be capable of sufficient resolution that the image quality of the resulting recording is comparable with existing consumer camcorder products.

Since the recorder will be worn on the body and the wearer may move actively about when the device is in operation, it is important that the entire device be mechanically rugged and that all components, particularly the storage media, be impervious to the shocks resulting from such body movement. The device is also likely to be exposed to environmental stresses such as dust and moisture so the components and packaging must accommodate this exposure. Solid state media such as compact flash memory is particularly suitable as the recorder's storage media since it meets these requirements.

Alternatively, the recorder device can be mounted on vehicles, planes or any other objects for ease of use. It is contemplated that the present invention can be used in military or field intelligence operations.

Thus, specific embodiments and applications of a loop recording with book marking recorder have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of storing discrete segments of imaged data in a camera, comprising:
   using a sensor in the camera to capture image data;
   providing a recorder coupled to the camera and having a memory;
   using multiple portions of the memory as a memory loop in which to record segments of the image data in approximately real time;
   treating the memory loop as a single file;
   protecting the multiple portions, within the single file, from being overwritten by subsequent recording in the memory loop; and
   allowing the editing of the imaged data in protected multiple portions stored in the memory loop within the single file via a recorder control while recording additional segments of the image data in the memory loop within the single file.

2. The method of claim 1, wherein the loop is sufficiently large to store at least five minutes of the image data.

3. The method of claim 1, further comprising storing first and second ones of the multiple portions as separate files.

4. The method of claim 1, further comprising storing first and second ones of the multiple portions in a common file.

5. The method of claim 1, further comprising continuing to record the image data immediately after ending at least one of the segments.

6. The method of claim 1, further comprising continuing to record the image data immediately after protecting at least one of the segments.

7. The method of claim 1, further comprising designating a beginning of a first one of the multiple portions in response to a start signal from a user of the camera.

8. The system of claim 7, further comprising using a switch in a clothing accessory to operate an aspect of the method.

9. The method of claim 7, further comprising designating an end of the first one of the multiple portions in response to a stop signal from the user.

10. The method of claim 7, wherein the start signal comprises a manually operated switch.

11. The method of claim 7, wherein the start signal comprises an audio signal.

12. The method of claim 7, further comprising including in the first one of the multiple portions, a time span of the image data that occurred prior to the start signal.

13. The method of claim 12, wherein the time span comprising at least 5 seconds.

14. The method of claim 12, wherein the time span comprising at least 15 seconds.

15. The method of claim 1, further comprising wirelessly transmitting a first one of the segments to a remote memory, and releasing a corresponding one of the multiple portions of memory from protection.

16. A system comprising electronics that implements the method of claim 1, and a clothing accessory that supports the sensor.

17. The system of claim 16, wherein the clothing accessory comprises a pair of glasses.

18. The system of claim 17, further comprising providing a viewfinder in a lens of the glasses.

19. The method of claim 1, wherein the step of allowing the editing of the image data while recording additional segments in the loop includes an action selected from the group consisting of book-marking an additional portion of the loop memory, and releasing a protected portion of the memory from protection.

\* \* \* \* \*